United States Patent Office 3,060,822
Patented Oct. 30, 1962

3,060,822
DEVICE INTERCONNECTING THE EXPOSURE METER AND THE LENS DIAPHRAGM OF A CAMERA
Soichiro Matsuzaki, Tokyo, Japan, assignor to Olympus Kogaku Kogyo Kabushiki-Kaisha, Tokyo, Japan, a corporation of Japan
Filed Dec. 9, 1959, Ser. No. 858,352
Claims priority, application Japan Dec. 10, 1958
2 Claims. (Cl. 95—10)

This invention relates to a device in a camera equipped with a built-in exposure meter for automatically actuating the lens aperture adjusting mechanism according to the rotational movement of the exposure meter axis.

The exposure light value is to be determined by combination of two factors, i.e. the area of the lens aperture and the exposure time. With respect to a cine-camera in which the exposure time is generally constant, the proper exposure light value may be obtained by determining the area of the opening of the lens diaphragm relative to the brightness of the object to be photographed. In other words, the amount of deflection of the exposure meter pointer will be taken as a function of the lens aperture only. Consequently, in designing an exposure meter interconnecting device, firstly it is attempted to provide a mechanism adapted to automatically adjust the opening area of the lens diaphragm according to the amount of angular displacement of the rotational element of the exposure meter. Secondly, in case of a camera equipped with a shutter of variable exposure time, or in case of a camera in which exposure factors other than the diaphragm opening should be varied, it is usually necessary to incorporate means for effecting compensation according to such factors in said interconnecting device between the exposure meter and the lens diaphragm.

The object of this invention is to provide an improved device interconnecting the exposure meter and the lens diaphragm adjusting mechanism, which has been designed on the basis of the above mentioned requirement, and which is simple and practical in construction and is accurate and reliable in operation.

For a better understanding of the invention, reference should be had to the accompanying drawings, wherein.

Figures 1, 2:
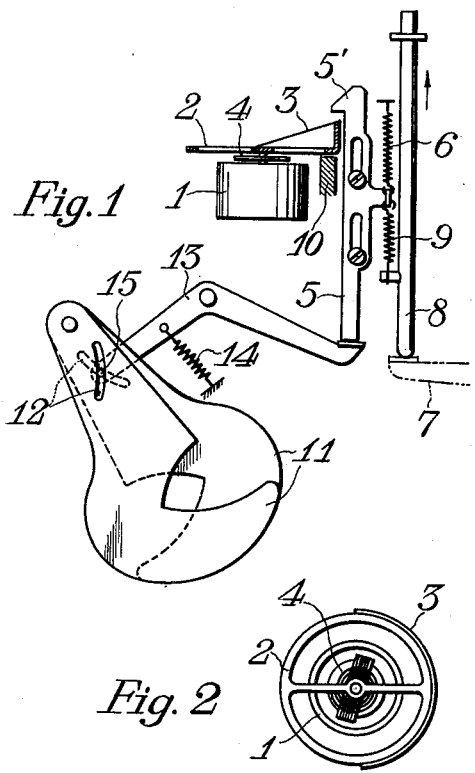
FIGURE 1 is a front view of the device according to this invention.
FIGURE 2 is a plan view of the exposure meter having a cam ring used in the device.

Referring to FIGURE 1, the reference numeral 1 designates an exposure meter provided in a camera body (not shown). On the axis of the exposure meter is secured, instead of a conventional pointer, the center of a light weight ring 2 by means of a diametrical resilient arm thereof. Integral with said ring 2, there is formed an upright cam 3 having inclined cam edge gradually varying its height in the circumferential direction. This cam 3 extends in parallel with the axis of the exposure meter 1 and has its cam face which is normal to the axis of the exposure meter. 4 is a centralising spiral spring for holding said cam 3 in its initial or normal position. Mounted on the camera body there is a bar 5 which is slidable in parallel with the axis of the exposure meter. The bar 5 has a hooked end 5' at the upper end thereof and is connected to the camera body by means of a coil spring 6 on one hand, and on the other hand is also connected by means of another coil spring 9 to a rod 8 which is operatively abutting against a shutter release lever 7. The spring force of said spring 9 is greater than that of the spring 6, and said two springs 6 and 9 are normally held balanced, so that the hooked end 5' of the slidable bar 5 is held out of contact with the cam 3, slightly apart therefrom.

11 designates two pivoted blades which are slidably superposed to form a lens aperture therebetween. Near the pivoted end, each blade 11 is provided with an arcuate slot 12, two slots being reversely inclined so as to cross each other as shown. Pivotally mounted on the camera body, there is a lever 13 biased by a spring 14 having tendency to turn the lever in the counterclockwise direction. The free end of one arm of said lever 13 has a pin 15 loosely engaging with the arcuate slots 12 at the crossing point. The free end of the other arm of the lever 13 is abutting against the lower end of the slidable bar 3 with minimum pressure.

While in the embodiment shown the diaphragm blades 11 are shown as having a tendency of closing motion, the same blades may be given a tendency of opening motion by modifying the structure of the intermediate lever mechanism.

When the camera equipped with the device according to this invention is directed toward the object to be photographed, the ring 2 will be rotated according to the brightness of the object. By manually actuating the push rod 8 from outside of the camera body, the spring 6 will first be tensioned and the bar 5 will be slid in the direction same as the moving push rod 8, and downwardly in FIGURE 1, bringing thereby the hooked end 5' of the bar into contact with the operative edge of the cam 3 and pushing the ring 2 against a stop 10 on the camera body. The movement of the push rod 8 is continued further, tensioning the lower spring 9, and it will actuate the shutter release lever 7. During the above mentioned movement, the amount of movement of the bar 5 varies according to the height of the cam edge at the point beneath the hooked end 5' of the bar, in other words the amount of the angular motion of the ring 2, or the brightness of the object. Said movement of the bar 5 is transmitted to the diaphragm blades 11 through the lever 13 or other intermediate mechanism in the manner which will readily be understood from the illustration. Thus, the desired aperture area of the lens diaphragm may be obtained automatically by means of the exposure meter through the device according to this invention.

According to another modification of the device of this invention, the slidable bar 5 may be replaced by a horizontal lever pivoted on the camera body and having one end adapted to engage with and press the cam edge 3 and the other end connected directly or indirectly to the diaphragm actuating mechanism. In such modified form, the desired compensation according to variation of the shutter speed or the equivalent value, such as the sensitivity of the film, kind of filter, speed of feed of the film in case of cine-camera, slot angle of the shutter, etc. may be effected by shifting the pivotal point of said lever.

According to still another modification of the invention, especially where the invention is applied to a camera equipped with a light-value shutter, it may be so arranged that the amount of movement of the bar 5 or its equivalent is transmitted to a light-value ring of the shutter.

From the foregoing, it will be noted that according to the invention the exposure meter is equipped, instead of conventional pointer, with the ring having the upright cam edge having gradually varying height, said cam edge being adapted to be engaged by the bar interconnected with the pushing rod for actuating the shutter release lever through the springs, and that the movement of said bar is utilized for actuating the lens diaphragm adjusting mechanism, thereby obtaining the desired area of the diaphragm aperture.

In contradistinction to the hereto proposed device, in which the oscillatory motion of a slender pointer of the exposure meter is utilized, the device for interconnecting the exposure meter with the lens diaphragm adjusting mechanism according to this invention is simple and durable in construction, and is accurate and reliable in operation.

What I claim is:

1. In a camera equipped with a built-in exposure meter for measuring light values, a lens diaphragm adjusting mechanism for adjusting the size of the lens aperture, and a shutter actuating means for actuating a shutter, an improved interconnecting device for limiting, by means of the exposure meter, the operation of the lens diaphragm adjusting mechanism by said shutter actuating means, said improved interconnecting device comprising; a ring mounted for rotation on the exposure meter and rotatably positioned responsive to the operation of said exposure meter when measuring light; cam means rotatable with and projecting from said ring and defining a cam edge extending peripherally around a portion of the circumference of the ring and extending parallel with the axis of said exposure meter and having its cam face normal to the axis of the exposure meter, said cam edge ends marking the range of light values smoothly and continuously from the greatest to the least; a movable member mounted adjacent and parallel to said cam means and having a projection normal to said cam means for abutting the cam edge, said movable member being movable in its mounting for the distance said cam edge extends outwardly from the ring and operably connected to said lens diaphargm adjusting mechanism; and resilient means operatively connecting said movable member to said shutter actuating means, whereby the operation of said shutter actuating means actuates the movable member to abut the cam edge rotationally positioned responsive to the operation of said exposure meter, thereby operating said lens diaphragm adjusting mechanism to adjust the size of the lens aperture in accordance with said light values.

2. The combination as described in claim 1 and characterized in that said lens diaphragm adjusting mechanism comprises; two blades pivoted together at one end to slidably define a lens aperture at the other end, said blades respectively defining arcuate slots extending generally longitudinaly but reversely inclined to cross, said slots being positioned between the pivot end and the lens aperture forming portions of said blades; a lever member, having two ends, pivotally supported between said ends, one said end connecting to said movable member for the rotation of said lever member about said pivot support, and the other end carrying a pin for loosely engaging in the arcuate slots at their crossing whereby the pivoting of said lever member moves said crossing toward the lens aperture defining end of the blades to close the lens aperture, and toward said pivot end of the blades to open said lens aperture.

References Cited in the file of this patent

UNITED STATES PATENTS

| Re. 21,034 | Karg | Mar. 21, 1939 |
|---|---|---|
| | (Original No. 2,061,909) | |
| 2,260,120 | Mayer | Oct. 21, 1941 |
| 2,887,025 | Rentschler | May 19, 1959 |
| 2,923,216 | Greger | Feb. 2, 1960 |
| 2,930,282 | Herterich | Mar. 29, 1960 |

FOREIGN PATENTS

| 193,940 | Switzerland | Feb. 1, 1938 |